United States Patent
Miyauchi et al.

(10) Patent No.: US 6,574,622 B1
(45) Date of Patent: Jun. 3, 2003

(54) APPARATUS AND METHOD FOR DOCUMENT RETRIEVAL

(75) Inventors: Tadanobu Miyauchi, Nakai-machi (JP); Shigehisa Kawabe, Nakai-machi (JP)

(73) Assignee: Fuji Xerox Co. Ltd., Tokyo (JP)

( * ) Notice: Subject to any disclaimer, the term of this patent is extended or adjusted under 35 U.S.C. 154(b) by 0 days.

(21) Appl. No.: 09/384,544

(22) Filed: Aug. 27, 1999

(30) Foreign Application Priority Data

Sep. 7, 1998 (JP) .......................................... 10-252145

(51) Int. Cl.$^7$ ............................................. G06F 17/30
(52) U.S. Cl. .................................. 707/4; 707/5; 707/10
(58) Field of Search .............................. 707/4, 5, 6, 3, 707/10

(56) References Cited

U.S. PATENT DOCUMENTS

| | | | | |
|---|---|---|---|---|
| 5,640,553 A | * | 6/1997 | Schultz | 707/5 |
| 5,675,819 A | * | 10/1997 | Schuetze | 704/10 |
| 5,737,734 A | * | 4/1998 | Schultz | 707/5 |
| 5,761,496 A | * | 6/1998 | Hattori | 707/4 |
| 5,765,147 A | * | 6/1998 | Mattos | 707/4 |
| 5,963,940 A | * | 10/1999 | Liddy | 707/5 |
| 6,006,221 A | * | 12/1999 | Liddy et al. | 704/2 |
| 6,006,225 A | * | 12/1999 | Bowman et al. | 707/10 |
| 6,026,388 A | * | 2/2000 | Liddy et al. | 704/9 |
| 6,076,088 A | * | 6/2000 | Paik | 707/5 |
| 6,169,986 B1 | * | 1/2001 | Bowman et al. | 707/10 |
| 6,269,368 B1 | * | 7/2001 | Diamond | 707/6 |

FOREIGN PATENT DOCUMENTS

| | | | |
|---|---|---|---|
| JP | 6-274538 | 9/1994 | G06F/15/40 |
| JP | 8-129554 | 5/1996 | G06F/17/30 |
| JP | 9-153051 | 6/1997 | G06F/17/30 |
| JP | 10-74210 | 3/1998 | G06F/17/30 |

* cited by examiner

Primary Examiner—John Breene
Assistant Examiner—Khanh Pham
(74) Attorney, Agent, or Firm—Oliff & Berridge, PLC

(57) ABSTRACT

Document retrieval system and method are disclosed which can diminish a gap between the user's retrieval intention in information retrieval and the configuration of a query as well as document representations in database and which permits easy retrieval reflecting the user's retrieval intention. The user enumerates a group of words which the user hits upon, as a primary query. Upon receipt of the primary query, the system estimates relational representations which the words (group) of the primary query can possess, and then makes expansion of the query through a partial coincidence of the relational representations and sample spaces extracted from document data to prepare a query candidate representation group. The expanded query candidate representation group is presented to the user. The user then simply chooses a relational representation candidate in accordance with his or her intention. A retrieval execution query is constituted by the thus-selected representation.

20 Claims, 16 Drawing Sheets

FIG. 2

Refine your search by requiring a few relevant topics, excluding irrelevant ones, and ignoring the others.

[GRAPH ▸]

[Search] [Refine Again]

- [ ... ▾] 91% Cakes, delicious, recipes, cookies, cookbook
- [ ... ▾] 44% Cake, cream, chocolate, butter, vanilla, cinnamon, cheesecake, fudge, icing
- [Exclude ▾] 42% Salads, breads, sandwiches, pastries, pies, soups, muffins, sauces, burgers
- [ ... ▾] 41% Desserts, appetizers, entrees
- [Require ▾] 40% Baked, fresh, fruit
- [Exclude ▾] 38% Salad, grilled, sauce, chicken, fried, shrimp, sauteed, steak, fries
- [ ... ▾] 38% Cheese, topped, tomato, served, onions, cheddar, peppers, lettuce, provolone
- [ ... ▾] 36% Dishes, seafood, veal, steaks
- [ ... ▾] 30% Baking, bake, oven, preheat, greased, floured
- [Require ▾] 29% Homemade, freshest, quiche
- [Exclude ▾] 29% Pasta, beans, rice, noodles
- [ ... ▾] 28% Dessert, creamy, cheesecakes
- [ ... ▾] 27% Flour, sugar, cup, cups, tablespoons, teaspoon, tablespoon, teaspoons
- [ ... ▾] 27% Roasted, vinaigrette, balsamic, croutons, crusted, risotto, braised, aioli
- [Require ▾] 26% Recipe, ingredients, dough
- [ ... ▾] 26% Bread, biscuits, sourdough, biscuit
- [ ... ▾] 25% Cooking, cookbooks, cooks, cookery
- [ ... ▾] 25% Gourmet, coffee, tea, teas, cappuccino, coffees, chocolates, espresso, baskets
- [ ... ▾] 25% Bakery, deli, wedding, bakeries, bakers
- [ ... ▾] 24% Vegetables, meats, snacks, candies, stews, barbeque

[Search] [Refine Again]

FIG. 3

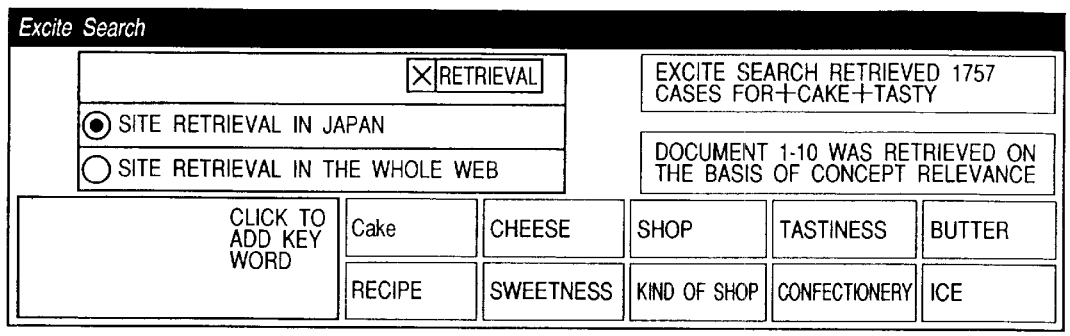

| Title | 81% | CAKE SHOP LOCATED NEAR HANKYU MIKAGE [More like this] |
|---|---|---|
| URL | | http:// |
| Summary | | REFINED SWEETNESS ENABLES ME TO EAT WITHOUT LIMIT. I THINK THE CAKES HERE ARE THE BEST I HAVE EATEN. THE SANNOMIYA SHOP IS THE HEAD SHOP. |

| Title | 79% | WHAT IS THE CAKE FRIENDS GROUP ? [More like this] |
|---|---|---|
| URL | | http://www. |

| Title | 79% | kasigyo-imori [More like this] |
|---|---|---|
| URL | | http://www. |

| Title | 79% | danfansu [More like this] |
|---|---|---|
| URL | | http:// |

| Title | 78% | GUIDE TO SHOPS OFFERING TASTY FOODS AND DRINKS [More like this] |
|---|---|---|
| URL | | http:// |

| Title | 78% | CHOCOLATE CAKE [More like this] |
|---|---|---|
| URL | | http://www. |

| Title | 78% | CAKES AT JONCIER [More like this] |
|---|---|---|
| URL | | http://www. |

| Title | 78% | CAKE SCHOOL OFFERING TASTINESS AND PLEASURE [More like this] |
|---|---|---|
| URL | | http://www. |

| Title | 78% | GO TO HOME CAKE FOR HOMEMADE CAKE [More like this] |
|---|---|---|
| URL | | http://www. |

FIG. 4

KEY WORD : CAKE AND TASTY
HIT CASE : 33 CASES
DISPLAY CASE : 20 CASES (1—20)

[NEXT PAGE]

KEY WORD : [                    ] (RETRIEVAL)
⊙ RESTRICT DATA ○ NEW RETRIEVAL

○ CHECK THE LEFT-END CHECK BOX AND YOU CAN RETRIEVE A PAGE SIMILAR TO THAT PAGE.

☑ 1. HOMEMADE CHEESE CAKE SPECIALIST BONO BONO
HOW ABOUT TASTY CHEESE CAKES MADE IN HOKKAIDO ? THE CHEESE CAKES OF A HOMEMADE CHEESE CAKE SPECIALIST BONO BONO ARE MADE USING FRESH MATERIALS AND ARE SOFT TO THE BODY. YOU ALSO FIND WORD-OF-MOUTH INFORMATION FOR SAPPORO.

☐ 2. CAKE SHOPS OFFERING TASTY CAKES
CAKE SHOPS AND CREAM PUFF SHOPS OFFERING TASTY CAKES AND CREAM PUFFS AND LOCATED NEAR HAMAMATSU, SHIZUOKA PREFECTURE, ARE INTRODUCED. CAKES WITH A LOT OF FRUITS IN SEASON PUT ON THEM, AS WELL AS CAKES AND CREAM PUFFS WHICH THE SHOP OWNERS RECOMMEND, ARE INTRODUCED. ALSO INTRODUCED ARE IMPRESSIONS OF CAKES SO FAR TASTED.

☑ 3. SHOP OF HOMEMADE CAKE AND BREAD MATERIALS AND TOOLS
"HOME CAKE" IS A SHOP OF HOMEMADE CAKE AND BREAD MATERIALS AND TOOLS, PROVIDING ESSENTIAL CONFECTIONERY TOOLS MEETING VARIOUS NEEDS OF BOTH BEGINNERS AND PROFESSIONALS. FULL OF INFORMATION USEFUL TO YOUR DESIRE FOR FURTHER POWER-UP OF CONFECTIONERY MAKING !!

☐ 4. MIRABELL "CAKE ROOM"
FULL OF INFORMATION OF CAKES SUCH AS "SACHER TORTE" WHICH MIRABELL OFFERS WITH VIENNESE TASTE! "BLUE DANUBE", TABLEWARE WHICH ACCENTUATES TASTINESS OF CAKE, IS ALSO INTRODUCED. OF COURSE, ON-LINE ORDER IS OK !

☐ 5. HARENO-HI, A CAKE SHOP OFFERING CAKES WHICH MAKE YOUR MOUTH WATER
BOTH THE CAKES AND SHOP ARE HAND-MADE! HARENO-HI, A CAKE SHOP OFFERING TASTY CAKES IS FULL OF RECOMMENDED CAKES, RECIPE INTRODUCTION, MAIL ORDER, AND HOBBY V6 INFORMATION !

☐ 6. CHEESE CAKE FACTORY, FUTAGO-TAMAGAWA, TOKYO, APPEARS IN INTERNET !!
RENEWAL OPEN IN INTERNET OF "CHEESE CAKE FACTORY", FUTAGO-TAMAGAWA, TOKYO !! OFFERS TASTY CHEESE CAKES FRESH FROM THE OVEN WITH MIGHT AND MAIN. EVEN GOURMETS WILL SURELY HAVE SATISFACTION !

☐ 7. HOME PAGE OF MAMATARTE, DAIKANYAMA
HOME PAGE OF MAMATARTE, A CAKE SHOP IN DAIKANYAMA. THOSE WHO LIKE CAKES, PLEASE DROP IN. PHOTOGRAPHS SHOWING CAKES AND THE APPEARANCE OF THE SHOP ARE ALSO AVAILABLE.

☑ 8. HOW ABOUT TASTY HOMEMADE CAKES ?
CAKES HOMEMADE IN A MANNER TAUGHT BY AN AMERICAN. IT TOOK US TEN YEARS TO COMPLETE A UNIQUE GOOD TASTE. IMPROVED SO AS TO SUIT THE JAPANESE TASTE. TWO KINDS AVAILABLE : BANANA BREAD AND PINEAPPLE BREAD. WE WILL OFFER OUR CAKES AT COST TO THOSE WHO DESIRE TO EAT. ONCE YOU TRY OUR CAKES, YOU WILL SURELY BECOME AWARE HOW DIFFERENT OUR CAKES ARE FROM OTHERS.

☑ 9. ♪♪ RECHERCHER ♪♪ CONFECTIONERY GOING VERY WELL WITH COFFEE
RECIPE OF CONFECTIONERY WHICH GOES VERY WELL WITH COFFEE. HOW ABOUT HAVING A GOOD TIME WITH CONFECTIONERY AND COFFEE ?

☐ 10. HOME PAGE OF A COFFEE SHOP, CAFE CALECHE
A COFFEE SHOP, CAFE CALECHE, LOCATED IN FUJIYAMADAI, KASUGAI, AICHI PREFECTURE, IS INTRODUCED, OFFERING TASTY COFFEE AND HOMEMADE CAKES. ON THE MENU ARE FOUND POWDERED TEA WHICH IS NOT AVAILABLE IN THE ORDINARY TYPE OF COFFEE SHOPS, AS WELL AS HOMEMADE JAPANESE STYLE CAKES. YOU CAN SEE THE MENU AND LOCATION (MAP) OF THE SHOP.

☐ 11. MARRONNIER, A CAKE SHOP OFFERING TASTY FRESH CREAM (KUNITACHI, TOKYO)
CAKES, CONFECTIONERY, AND COOKIE "TENDRE" HAVING LITTLE INFLUENCE ON ATOPY, ARE SOLD. TENDRE IS BAKED WITHOUT USING ANY OF EGG, MILK AND SOYBEAM WHICH ARE THREE MAJOR ALLERGENS. IN A 2ND-FLOOR COFFEE SHOP YOU CAN EAT BAGEL WHICH IS NOW ENJOYING POPULARITY.

☐ 12. A CLASS FOR NATURAL YEAST BREAD

FIG. 8

| TYPICAL RELATIONAL REPRESENTATION | MODIFIED WORD | | NUMBER OF TIMES | RELATIONAL REPRESENTATION |
|---|---|---|---|---|
| | TASTY | WORD | | |
| TASTY CAKE | | CAKE | 120 | CAKE [GA-NOMINATIVE/MO-ADDITION] TASTY, TASTY [ADJECTIVE+NOUN] CAKE |
| TASTY CONFECTIONERY | | CONFECTIONERY | 52 | CONFECTIONERY [GA-NOMINATIVE] TASTY, TASTY [ADJECTIVE+NOUN] CONFECTIONERY |
| TASTY CHOCOLATE | | CHOCOLATE | 48 | CHOCOLATE [GA-NOMINATIVE] TASTY, TASTY [ADJECTIVE+NOUN] CHOCOLATE |
| TASTY COFFEE | | COFFEE | 40 | COFFEE [GA-NOMINATIVE] TASTY, TASTY [ADJECTIVE+NOUN] COFFEE |
| SHOP OFFERING TASTY FOODS AND DRINKS | | SHOP | 38 | TASTY [ADJECTIVE+NOUN] SHOP |
| TASTY HOMEMADE FOOD | | HOMEMADE | 32 | HOMEMADE [DE-"AND"] TASTY, TASTY [ADJECTIVE+NOUN] HOMEMADE |
| CAKE SHOP OFFERING TASTY CAKES | | CAKE SHOP | 22 | TASTY [ADJECTIVE+NOUN] SHOP |
| TASTY TEA | | TEA | 21 | TEA [GA-NOMINATIVE] TASTY, TASTY [ADJECTIVE+NOUN] TEA |
| TASTY BAKED CONFECTIONERY | | BAKED CONFECTIONERY | 16 | BAKED CONFECTIONERY [GA-NOMINATIVE/MO-ADDITION] TASTY |
| FEEL OF GOOD TASTE | | FEEL | 12 | TASTY [ADJECTIVE+NOUN] FEEL |

FIG. 9

| TYPICAL RELATIONAL REPRESENTATION | WORD | NUMBER OF TIMES | RELATIONAL REPRESENTATION |
|---|---|---|---|
| TASTY CAKE | TASTY | 145 | TASTY [ADJECTIVE+NOUN] CAKE, CAKE [GA-NOMINATIVE/MO-ADDITION/HA-NOMINATIVE] TASTY |
| FAVORITE CAKE | LIKE | 37 | CAKE [GA-NOMINATIVE] LIKE, FAVORITE CAKE |
| FAMOUS CAKE | FAMOUS | 24 | CAKE [DE-"FOR"] FAMOUS, FAMOUS FOR CAKE |
| BIG CAKE | BIG | 19 | CAKE [MO-ADDITION] BIG |
| SWEET CAKE | SWEET | 15 | SWEET [ADJECTIVE+NOUN] CAKE |
| SIMPLE CAKE | SIMPLE | 13 | SIMPLE CAKE |
| PRETTY CAKE | PRETTY | 10 | PRETTY [ADJECTIVE+NOUN] CAKE |
| LIGHT CAKE | LIGHT | 7 | LIGHT [ADJECTIVE+NOUN] CAKE |
| EXPENSIVE CAKE | EXPENSIVE | 5 | EXPENSIVE [ADJECTIVE+NOUN] CAKE, CAKE [HA-NOMINATIVE] EXPENSIVE |
| REFRESHING CAKE | REFRESHING | 4 | REFRESHING CAKE |

REFRESHING --MODIFY--> CAKE / NOUN

FIG. 10

| TYPICAL RELATIONAL REPRESENTATION | WORD | NUMBER OF TIMES | SCORE | RELATIONAL REPRESENTATION |
|---|---|---|---|---|
| EAT CAKE | EAT | 60 | 120 | ATE [VERB+NOUN] CAKE, CAKE [WO-ACCUSATIVE] EAT |
| MAKE CAKE | MAKE | 43 | 86 | CAKE [WO-ACCUSATIVE] MAKE |
| INTRODUCTION OF CAKE | INTRODUCE | 45 | 45 | CAKE [NO-"OF"/NULL] INTRODUCTION |
| USED CAKE | USE | 22 | 44 | USED [VERB+NOUN] CAKE |
| BAKE CAKE | BAKE | 18 | 36 | CAKE [WO-ACCUSATIVE] BAKE |
| BUY CAKE | BUY | 16 | 32 | CAKE [WO-ACCUSATIVE] BUY |
| SELL CAKE | SELL | 28 | 28 | CAKE [NO-"OF"/WO-ACCUSATIVE] SELL |
| CUT CAKE | CUT | 11 | 22 | CAKE [WO-ACCUSATIVE] CUT |
| PUBLISH CAKE | PUBLISH | 15 | 15 | CAKE [WO-ACCUSATIVE] PUBLISH |
| CHOOSE CAKE | CHOOSE | 7 | 14 | CHOOSE [VERB+NOUN] CAKE, CAKE [WO-ACCUSATIVE] CHOOSE |

CAKE

| | EAT | 20 | 40 | TASTY (TASTILY) [ADJECTIVE+VERB] EAT |
|---|---|---|---|---|
| | COOK | 17 | 17 | TASTY (TASTILY) [ADJECTIVE+VERB] COOK |
| | MAKE | 8 | 16 | TASTY (TASTILY) [ADJECTIVE+VERB] MAKE |
| | SHOW | 7 | 14 | TASTY (TASTILY) [ADJECTIVE+VERB] SHOW |
| | BAKE | 5 | 10 | TASTY (TASTILY) [ADJECTIVE+VERB] BAKE |

TASTY (TASTILY)

FIG. 11

| TYPICAL RELATIONAL REPRESENTATION | WORD | NUMBER OF TIMES | RELATION REPRESENTATION |
|---|---|---|---|
| CHEESE CAKE | CHEESE | 72 | CHEESE [NULL] CAKE |
| CAKE TASTE | TASTE | 67 | CAKE [NO-"OF"] TASTE |
| CAKE SHOP | SHOP | 53 | CAKE [NO-"OF"] SHOP |
| CHOCOLATE CAKE | CHOCOLATE | 41 | CHOCOLATE [NULL] CAKE |
| HOMEMADE CAKE | HOMEMADE | 36 | HOMEMADE [NULL] CAKE, HOMEMADE [NO-"OF"] CAKE |
| SHORT CAKE | SHORT | 27 | SHORT [NULL] CAKE |
| DECORATION CAKE | DECORATION | 27 | DECORATION [NULL] CAKE |
| CAKE TOPPING | TOPPING | 18 | CAKE [NO-"OF"] TOPPING |
| FRUIT CAKE | FRUIT | 16 | FRUIT [NULL] CAKE |
| KIND OF CAKE | KIND | 14 | CAKE [NO-"OF"] KIND |

CAKE

FIG. 16

RETRIEVAL RESULT OF "(LIGHT OR SIMPLE) [MODIFY] (SOUFFLE OR CHIFFON)"

1     HOW ABOUT JOINING A CLASS FOR HOMEMADE CAKE ?
99% http://www.jin.ne.jp/cakehous/cs.htm
    HOW ABOUT CHALLENGING HEARTY CAKE MAKING ? CAKE HOUSE IS HOLDING A CLASS IN HOMEMADE CAKE.
....

2     MAKING A CONFECTIONERY TOUR OF THE WORLD
94% http://www3.meshnet.or.jp/s-royal/conf/gyousa.htm
    ◆CHIFFONE, A SOFTLY BAKED CAKE USING FROTHED ALBUMEN, ETC. ◆SOUFFLE, A SWOLLEN (SOUFFLE-LIKE) WHIPPED STATE.

3     WORD-OF-MOUTH INFORMATION SQUARE : LIKE THIS CAKE !
93% http://www.so-net.or.jp/p-planet/ku_cake.html
    WORD-OF-MOUTH INFORMATION SQUARE : CHEESE CAKE IS A LIGHT SOUFFLE-TYPE CAKE WHICH IS NOT TOO SWEET, AND A CAKE ITALIAN IS VERY TASTY WITH SPICE AND APPLE TASTE MATCHING EACH OTHER.

4     FIRST-PERSON NOVEL LOCUS OF LOVE
93% http://www.net-ibaraki.ne.jp/mozart/Locus/banngai2.htm
    ●YAYOI AND ASUKA'S "BEST FRIEND" PART IV : VERY DETAILED !! VOLUME OF CHEESE CHIFFON (CHEESE SOUFFLE) CAKE WHICH ANYONE CAN MAKE.

5     sketch
92% http://www.sun-inet.or.jp/~natsume/sketch.htm
    SKETCH UNTIL DECEMBER 1997, JANUARY/FEBRUARY/MARCH/APRIL/MAY/JUNE/JULY/ AUGUST/SEPTEMBER/OCTOBER/NOVEMBER/DECEMBER, APRIL 22ND (WED), WANT OF SLEEP ("_") DUE TO SITTING UP LATE EVERY NIGHT. BESIDES, TWELVE O'CLOCK ....

6     COLLECTION OF CONFECTIONERY RECIPES
88% http://www3.meshnet.or.jp/s-royal/choco/choco26.htm
    COLLECTION OF CONFECTIONERY RECIPES (26) ★★ CHIFFON CAKE OF POWDERED TEA ★★ DAMP LIGHTNESS OF CHIFFON CAKE APPEARS TO SUIT THE JAPANESE TASTE VERY MUCH. FURTHER, HOW ABOUT THE COMBINATION OF POWDERED TEA SUGARED RED BEANS ? ★★ BLACK-AND-WHITE COPY ....

7     HANAI & Co.Ltd. : excellence
88% http://www.hanai.co.jp/ex.html
    THEME <CLASSICAL COLON> <EXCELLENCE> INVOLVING A CLASSICAL MOOD IN A GENTLE ATMOSPHERE SUCH AS EMBROIDERY SO ELABORATE AS INDUCES YOUR UNCONSCIOUS DESIRE TO TOUCH AND THE MOTIF OF ORGANDY LEAVES ON THE NECK, BEIGE AND ....

8     96 SPECIAL ON SOLD-OUT ITEMS
87% http://www.m21.or.jp/Tame/backissue/9701bj/4-1.html
    BACK TO MENU TAKEFIVE CHIFFON CAKE ¥350 A CAFE IN FRONT OF STATION. YOU CAN EAT CAKES IN A JAZZ MUSIC ATMOSPHERE. KAGURADA 33?47, OGURA-CHO, UJI. TEL. 0774-21-3896. OPEN 11:00? TO 24:00 (ORDER STOP). CLOSED ON ....

9     Od Rankontoll
87% http://www.ntt-teleca.co.jp/playland/od_ran1.html
    ★ CAFE RENCONTRE ★ OPEN 10:00AM? TO 8:30PM (LAST ORDER 8:00PM), MENU ● CHIFFON CAKE SET ¥700 (HOMEMADE CHIFFON CAKE AND COFFEE USING HIGH-QUALITY BEANS, TASTEFUL TEA ....

FIG. 17

COINCIDENCE RANGE: NARROW ———|——— WIDE

INTERROGATIVE SENTENCE: [TASTY CAKE] [FEEDBACK!] [BATCH RETRIEVAL!]

EXPLANATION: ADJECTIVE+NOUN

TASTY.... (MODIFIED)
- ☐ CAKE  ☐ CONFECTIONERY  ☐ CHOCOLATE  ☐ COFFEE  ☐ SHOP
- ☐ HOMEMADE  ☐ CAKE SHOP  ☐ TEA  ☐ BAKED CONFECTIONERY  ☐ FEEL

ADJECTIVE+CAKE (MODIFY)
- ☐ TASTY  ☐ LIKE  ☐ FAMOUS  ☐ BIG  ☐ SWEET
- ☐ SIMPLE  ☐ PRETTY  ☐ LIGHT  ☐ EXPENSIVE  ☐ REFRESHING

CAKE WO-ACCUSATIVE VERB.... (ACTION ON OBJECT)
- ☐ EAT  ☐ MAKE  ☑ INTRODUCE  ☐ USE  ☐ BAKE
- ☐ BUY  ☐ SELL  ☐ CUT  ☑ PUBLISH  ☐ CHOOSE

TASTY (TASTILY)+VERB.... (STATE OF ACTION)
- ☐ EAT  ☐ COOK  ☐ MAKE  ☐ SHOW  ☐ BAKE

CAKE+NO-"OF", (NO-"OF") CAKE (NOUN COMBINATION, COMPOSITE WORD)
- ☐ CHEESE  ☐ TASTE  ☐ SHOP  ☐ CHOCOLATE  ☐ HOMEMADE
- ☐ SHORT  ☐ DECORATION  ☐ TOPPING  ☐ FRUIT  ☐ KIND

APPARATUS AND METHOD FOR DOCUMENT RETRIEVAL

BACKGROUND OF THE INVENTION

1. Field of the Invention

The present invention relates to a system and method for supporting information retrieval in database. Particularly, the invention is concerned with a system and method which establish a new query suitable for database retrieval on the basis of a primary query, i.e., a preliminary retrieval expression, inputted on the basis of a user's idea in accordance with the user's intention who executes information retrieval, and in which actual information retrieval is executed on the basis of the new query. According to the configuration of the present invention it becomes possible to effect easy and accurate information retrieval. More specifically, according to the system and method of the present invention, the user inputs a provisional primary query comprising a key word in accordance with the user's intention independently of the database configuration, while on the basis of the primary query thus inputted the system of the present invention presents to the user candidates for the query to be used as retrieval conditions suitable for the database space, and the user establishes a query for retrieval from among the candidates thus presented, allowing retrieval to be executed by the query thus established.

2. Description of the Related Art

Heretofore, studies for information retrieval have actively been conducted as part of a natural language processing technique. An information retrieval system is generally modeled as in FIG. 1. In this conventional model it is presumed that the following three gaps, according to a broad classification, are present in information retrieval.

(1) Gap between the user's retrieval intention and the query (retrieval expression) transcription in the system:

This gap is a difference which occurs when the user inputs and converts his or her retrieval intention (image) in accordance with a predetermined representation form. Since the retrieval intention is not clear, the presentation itself of query is in many cases difficult for those who are new to retrieval.

(2) Gap between the representation of query and a representation present in database:

In the retrieval system, matching is performed between information capable of being expressed by query and representation present in database, but there generally is a gap also between the two.

(3) Gap in relevance feedback conducted on the basis of the result of retrieval obtained:

Making reference to the result of retrieval outputted from the system, the user performs relevance feedback for approaching the retrieval information. However, it is difficult to judge whether the result of retrieval is in agreement with the user's intention or not; further, it is not until actual execution of retrieval that the influence of a change in query becomes clear.

Problems involved in the existing retrieval systems will be enumerated below in a corresponding relation to the above description.

A. Full Text Retrieval Based on Boolean Expression as an Example

It is presumed that the full text retrieval method will solve the above-mentioned problem (2). More particularly, in the case of a word described in a sentence, retrieval can be made from the description of that word and hence the gap present between the representation of query and a representation present in database is minimized. However, since this is a word-level solution, the above point (1) is a problem to users not accustomed to the query description language.

B. Retrieval Based on Natural Language Interface

A natural language interface has been proposed to solve the above problem A. This is presumed to diminish the gap of the above (1) by inputting a phrase or sentence which the user hits upon, directly as a query. However, the representation held in the database is not always the same as the input phrase, so if matching is tried for the two, it rather results in an increase of the gap (2). Since it is difficult to observe from the user side what matching is performed internally, it rather becomes difficult to effect relevance feedback, that is, the problem (3) is also actualized.

C. Relevance Feedback Support

On the basis of the result of retrieval, certain feedback support is performed for solving the above problem (3). It is also possible to combine the above A with B. The following are mentioned as examples, which, however, cannot be regarded as satisfactory solutions.

C-1. Showing a candidate list of restricted key words to the user, allowing the user to designate a word:

Using a query and a statistical information or the like between words present in the result of retrieval, such restricted candidates as in FIGS. 2 and 3 are shown. Both examples are in an actual Internet search engine and the example shown in FIG. 2 is an example of English words in Altavista (http://altavista.digital.com), in which displayed English key words are added and retrieval is rerun, whereby restriction of data is effected. FIG. 3 shows an example of Japanese words in Excite Japan (http://www.excite.co.jp), wherein a key word is selected from additional key words present at the upper stage and is added, thereby executing retrieval and permitting restriction of data. In Japanese Published Unexamined Patent Application No. Hei 10-74210 entitled "Document Retrieval Supporting Method and Document Retrieval Service Using Same," characteristic words are extracted on the basis of, for example, the frequency of each word appearing in a document and the user is allowed to select a word in accordance with to what extent the user is interested therein.

As is seen also from the example shown in FIG. 2 or 3, as long as a simple word-level frequency or co-occurrence is based, an increase in the number of analogous words or adjacent nouns is unavoidable and thus it becomes difficult to show appropriate candidates. This is a problem common to the conventional systems laid open so far. Moreover, since it is impossible for the user to judge in what manner the word concerned is used in the document, it is difficult to judge as to whether the word is to be selected as a retrieval word or not. It is also difficult to judge how the selection will be reflected in retrieval. This is also presumed to be because all the retrieval originally relies on only such information of a small size as words.

C-2. Allowing the user to designate a document close to the user's retrieval intention from among candidates:

An example is shown in FIG. 4. According to this configuration, as shown in the same figure, a new retrieval is executed on the basis of a feature quantity in the document designated by the user. The example shown in FIG. 4 is an example in a catalog home page retrieval of InfoNavigator (http://infonavi.infoweb.ne.jp). This system is what is called a manual catalog type system like Yahoo! for example. Since a summary is given by manual operation, it may be possible even at the summary level to judge whether document designation is to be made or not. In a robot type search engine, however, the head of a sentence is merely displayed in many cases. As to WWW document, it is impossible to specify an object and the user is not a specialist in many cases, and the judgment as to whether the page concerned is to be added to feedback or not is difficult unless the user sees actual page contents. In fact, the search of a robot collection page in the above search engine lacks this function.

In Japanese Published Unexamined Patent Application No. Hei 9-153051 entitled "Analogous Document Retrieving Method" there is shown an example of relevance feedback in ranking which uses n-gram (a character string of continuous n characters). However, it is difficult to grasp how a document selected for relevance feedback will be reflected in the result obtained. In addition, it is very troublesome to check the contents of document on the user side.

Thus, using a document as a unit of feedback results in too large an object size, giving rise to such problems as an increase in the user's burden caused by user's reading of the document and the necessity of keeping the reliability of a document such as a summary.

A retrieval method as a combination of the above various retrieval methods is disclosed in Japanese Published Unexamined Patent Application No. Hei 6-274538 entitled "Information Retrieval System," in which the contents of understanding of the system and the contents of generation of a retrieval expression are fed back to the user in the form of a natural language sentence. However, information based on a thesaurus or a related word dictionary in connection with the relation for use in reconfiguration is eventually handled at the word level of AND and OR, so if the user's intention is different from the configuration of the dictionary, it is difficult to effect feedback.

Reference is here made to Japanese Published Unexamined Patent Application No. Hei 8-129554 entitled "Relational Representation Extracting System and Retrieving System." According to these systems, a concept-based retrieval is conducted through a relational representation extracted from a natural language to solve the foregoing problems (1) and (2) to some extent. However, for a user familiar with Boolean retrieval and unfamiliar with a concept-based retrieval, it is sometimes difficult to show a concept-to-concept relation explicitly in a query. According to the method in question, concrete specifying of the relation rather contributes to the improvement of the relevance rate, that is, the gap is diminished. However, in the case of a simple connection using a composite word or NO-"OF," there is little difference from Boolean retrieval and thus this method becomes less effective. Further, no effective solution to the foregoing problem (3) has been made so far.

Thus, it has been difficult for all of the retrieving methods disclosed in the above related art literatures to satisfy all of the gap reduction requirements at various levels in the information retrieval model shown in FIG. 1.

SUMMARY OF THE INVENTION

It is an object of the present invention to solve the above-mentioned problems involved in the foregoing related art techniques and provide a configuration for diminishing the gaps at various levels in the information retrieval model shown in FIG. 1.

First, the user, without calling for strict coincidence with his or her retrieval intention, executes a provisional retrieval request called primary query and enumerates words or a group of words which the user has hit upon. By this primary query method there is attained a decrease of the foregoing "(1) Gap between the user's retrieval intention and the query transcription in the system."

The system, upon receipt of the primary query, once holds a part of the result of having retrieved the database, as a sample space, for the words (group) thus given as the primary query. Next, for the sample space as part of the retrieval result, the system estimates a relational representation (plural words and a relation thereof) which the words (group) of the primary query can possess, and upon partial coincidence of the relational representation with the sample space the system makes expansion of the query to prepare a query candidate group categorized in accordance with a predetermined standard. This query group synthesizing configuration based on the primary query permits synthesis of a query capable of executing retrieval for data held actually in the database. In feedback retrieval, the query thus synthesized can be given as it is, as a retrieval expression, to the system. Consequently, the foregoing "(2) Gap between the representation of query and a representation present in database" can be diminished.

A representation group of the expanded query candidates is presented to the user and the user can merely choose a relational representation candidate meeting his or her intention. Since the unit of selection is categorized with the relation between concepts as a unit for example, it is easy for the user to grasp a conceptual space in the object of retrieval. Thus, the foregoing "(3) Gap in relevance feedback conducted on the basis of the result of retrieval obtained" can be diminished.

Until a query candidate meeting the retrieval intention of the user is presented, the user repeats the above operations, including a halfway return, and using a combination of selected query candidates, the user prepares an actual query for the actual execution of retrieval and then conducts retrieval. Thus, according to the construction of the present invention, unlike the foregoing conventional retrieval systems, it becomes possible to effect information retrieval through query candidates matching both the concept of the user's retrieval intention and the system data space which constitutes a database. Thus, the user can easily operate a conceptual space matching the database space and executes information retrieval. In this way it becomes possible to effect information retrieval while diminishing the various gaps present in the conventional information retrieval model.

According to the present invention, which has been accomplished for achieving the foregoing object, there is provided a document retrieval system for the execution of document retrieval, comprising a primary query designating part that designates a primary query as a provisional retrieval expression, the primary query being constituted by enumeration of arbitrary words based on the intention of a user, a query candidate synthesizing part that, on the basis of the primary query designated by the primary query designating part, synthesizes a candidate group of a query capable of being designated as a document retrieval query, and a feedback indicating part that presents the query candidate group synthesized by the query candidate synthesizing part to the user and performs a relevance feedback for establishing a query selected from the thus-presented query candidate group as a query for the execution of document retrieval.

Preferably, the document retrieval system of the present invention further comprises a database which holds relational representation data included in documents and a relation expanding/reducing part that, on the basis of the primary query, extracts relation representation data corresponding to the primary query from the relational representation data held in the database, the relation expanding/reducing part being capable of expanding and reducing a relational representation range to be extracted, and on the basis of the relational representation data extracted by the relation expanding/reducing part, the query candidate synthesizing part synthesizes a candidate group of a query capable of being designated as a document retrieval expression.

Preferably, the extracted relational representation data includes a plurality of words and also includes data showing a correlation of the plural words.

Preferably, the relation expanding/reducing part used in the document retrieval system of the present invention comprises a relation estimating part that estimates a correlation of the words constituting the primary query, an expanding part that expands the constituent elements of the primary query into a relational representation on the basis of the correlation of the words estimated by the relation estimating part, and a partial coincidence retrieving part that, on the basis of the relational representation expanded by the expanding part, extracts from the database relational representation data partially coincident with the expanded relational representation.

Preferably, the relation expanding/reducing part further comprises a sample holding part that holds sample data obtained by sampling from the database, and the extraction of the relational representation data by the partial coincidence retrieving part is executed for the sample data held by the sample holding part.

Preferably, the expanding part classifies the constituent elements of the relational representation of the primary query estimated by the relation estimating part into one or more independent words (W) and relation data (R) showing a correlation of the independent words, and determines an independent word (W) for the retrieval to be executed by the partial coincidence retrieving part, or a combination of the independent word (W) with the relation data (R), and the partial coincidence retrieving part executes a partial coincidence retrieval on the basis of the independent word (W) or combination of the independent word (W) with relation data (R) determined by the expanding part.

Preferably, the relational representation expanded by the expanding part in the document retrieval system of the present invention is a representation corresponding to relational representation data cataloged beforehand as index in the database.

According to the present invention there also is provided a document retrieval method for the execution of document retrieval, comprising a primary query designating step of designating a primary query as a provisional retrieval expression which is constituted by enumeration of arbitrary words based on the intention of a user, a query candidate synthesizing step of synthesizing a candidate group of a query capable of being designated as a document retrieval query, on the basis of the primary query designated in the primary query designating step, and a feedback step of presenting to the user the query candidate group synthesized in the query candidate synthesizing step and establishing a query selected from the thus-presented query candidate group as a query for the execution of document retrieval.

The document retrieval method of the present invention further comprises a relational representation data extracting step of extracting relational representation data corresponding to the primary query from relational representation data held in a database which holds relational representation data included in documents, and the query candidate synthesizing step synthesizes a candidate group of a query capable of being designated as a document retrieval expression, on the basis of the extracted relational representation data.

Preferably, the relational representation data extracting step comprises a relation estimating step of estimating a correlation of the words which constitute the primary query, an expansion step of expanding the constituent elements of the primary query into a relational representation on the basis of the correlation of the words estimated in the relation estimating step, and a partial coincidence retrieving step which extracts from the database relational representation data partially coincident with the relational representation expanded in the expansion step, on the basis of the expanded relational representation.

Preferably, the extraction of the relational representation data in the partial coincidence retrieving step is executed for sample data held by a sample holding part that holds sample data obtained by sampling from the database.

Preferably, the expansion step comprises a step of classifying the constituent elements of the relational representation of the primary query estimated in the relation estimating step into one or more independent words (W) and relation data (R) showing a correlation of the independent words and then determining an independent word (W) for the retrieval to be executed by the partial coincidence retrieving part, or a combination of the independent word (W) with the relation data (R), and the partial coincidence retrieving step executes a partial coincidence retrieval on the basis of the independent word (W) or combination of the independent word (W) with relation data (R) determined in the expansion step.

BRIEF DESCRIPTION OF THE DRAWINGS

FIG. 2 is a diagram showing a candidate list of restricted key words in a conventional information retrieval (an example of English words);

FIG. 3 is a diagram showing a candidate list of restricted key words in a conventional information retrieval (an example of Japanese words);

FIG. 4 is a diagram showing a list display for selecting a document close to a retrieval intention in a conventional information retrieval;

FIG. 8 is a diagram explaining the expansion (a modified relation) of a relational representation group in the retrieval system of the present invention;

FIG. 9 is a diagram explaining the expansion (a modifying relation) of a relational representation group in the retrieval system of the present invention;

FIG. 10 is a diagram explaining the expansion (a relation of action) of a relational representation group in the retrieval system of the present invention;

FIG. 11 is a diagram showing the expansion (a noun connecting relation) of a relational representation group in the retrieval system of the present invention;

FIG. 16 is a diagram showing an example of a retrieval result display after the execution of retrieval in the retrieval system of the present invention;

FIG. 17 is a diagram explaining the section from query candidates and feedback in the retrieval system of the invention;

DETAILED DESCRIPTION OF A PREFERRED EMBODIMENT

Figure 1:
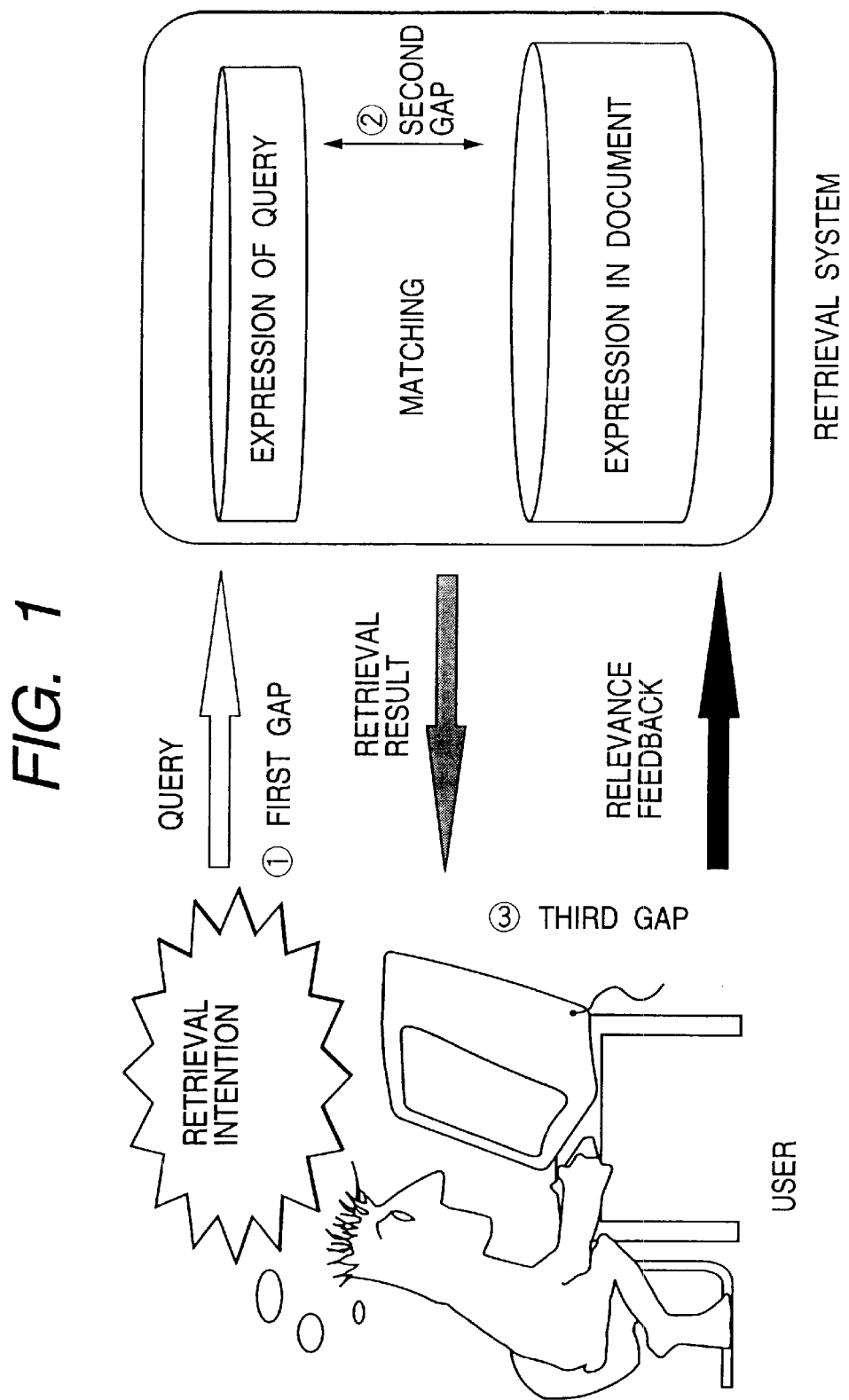
FIG. 1 is a diagram explaining various gaps in information retrieval (quoted from Proceedings of Japanese Society of Artificial Intelligence, Vol. 11, No. 1, "Trend of Intelligent Information Retrieval")
Figure 5:
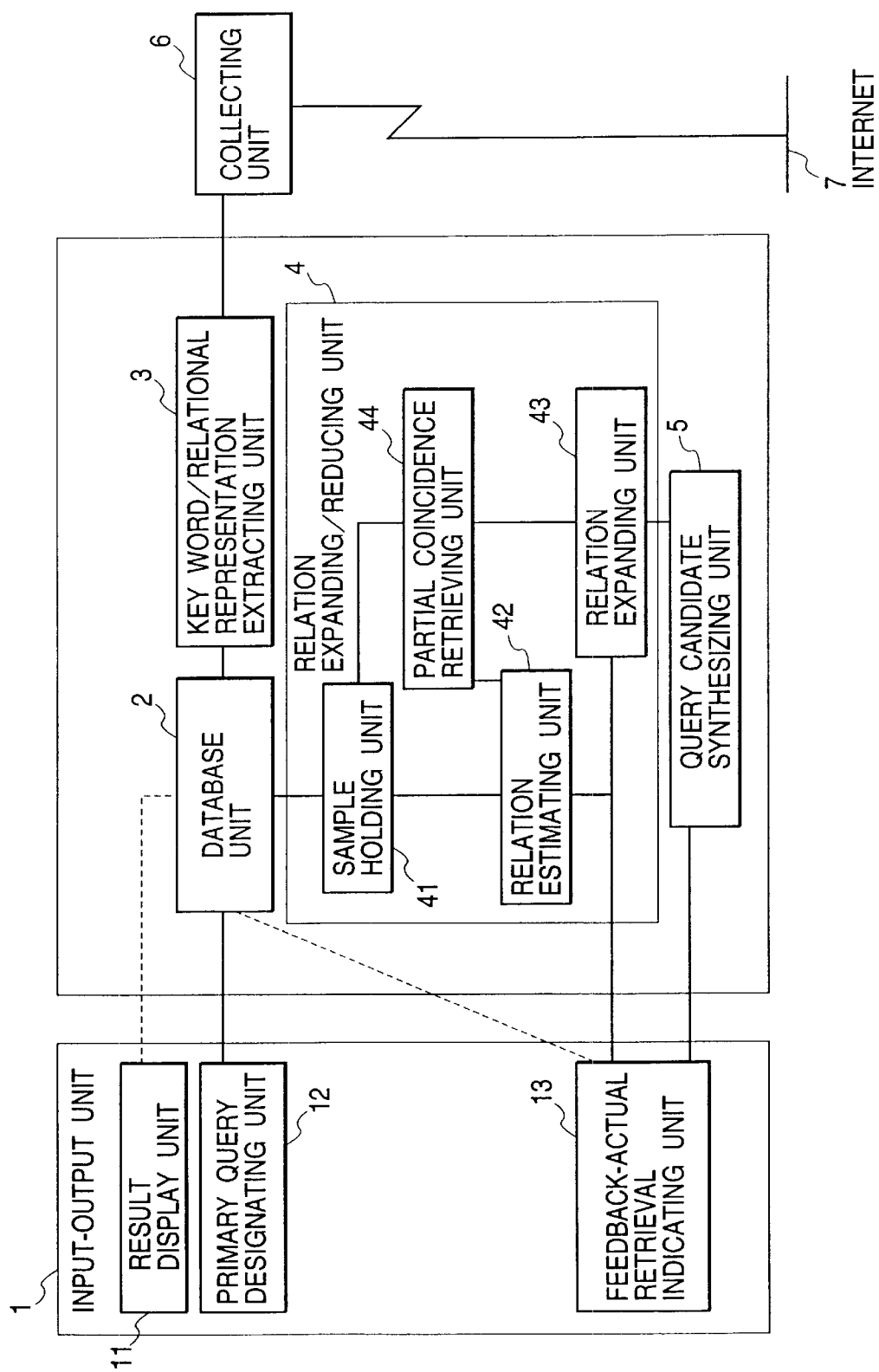
FIG. 5 is a block diagram of a retrieval system according to the present invention.

Referring to FIG. 5, there is illustrated a schematic configuration of a document retrieval system according to an embodiment of the present invention.

In the same figure, an input-output unit 1 comprises a result display unit 11, a primary query designating unit 12, and a feedback-actual retrieval indicating unit 13, and it is connected to the document retrieval system of this embodiment through a network. A document group collected beforehand from an Internet 7 by a collecting unit 6 is subjected to indexing in a key word/relational representation extracting unit 3 and is then held in a database unit 2. The database unit 2 is also connected to both a relation expanding/reducing unit 4 and the input-output unit 1. The relation expanding/reducing unit 4 comprises a sample holding unit 41, a relation estimating unit 42, a relation expanding unit 43, and a partial coincidence retrieving unit 44, and is connected to a query candidate synthesizing unit 5.

In the Internet environment the input-output unit 1 is actually a WWW browser for example and it transmits a retrieval indication to the retrieval system by GET or POST method via http (Hyper Text Transfer Protocol).

The collecting unit 6, which is what is called a robot or a spider, circulates on the Internet and collects WWW pages. The database unit 2 holds a large amount of an index group to pre-cataloged WWW pages (documents) and sends back a result in reply to a request for retrieval.

The key word/relational representation extracting unit 3 is for extracting a key which is for cataloging a document in the database unit 2, and it extracts key words (words) and relational representations from the WWW pages. The relational representations are each an extracted correlation of plural words.

The sample holding unit 41 holds sample sets of a preset appropriate number, say 100 high-rank cases, out of retrieval results obtained from the database unit 2 in reply to a request for retrieval. The relation estimating unit 42 estimates a relation in appropriate conditions on the basis of a relational representation group included in the sample set. The relation expanding unit 43 expands a relational representation upon coincidence of only a part of constituent elements, and the partial coincidence retrieving unit 44 performs the partial coincidence retrieval for the sample set held in the sample holding unit 41.

The query candidate synthesizing unit 5 has a configuration for synthesizing query candidates to be presented to the user through expansion and reduction of the above relations.

As an example of operation in this embodiment, the following description is now provided about an example of a query presenting system used in a search engine which is for a large volume of data and which is here assumed to be an Internet search engine.

The document retrieval system of this embodiment will now be described while giving an example of retrieval. It is here assumed that the user wants to obtain some information on "cake" as his or her retrieval intention. However, if the user's retrieval intention itself is not clear as noted above, or if the user is not accustomed to retrieval, the preparation of a query itself is very difficult. According to the document retrieval system of this embodiment, the user merely enumerates words which the user has hit upon and inputs these words to the input-output unit, whereby there is made a preliminary document retrieval starting procedure. Even for a user not familiar with the database configuration or how to retrieval, all that is required is mere successive input of words which the user hits upon, whereby a query can be described provisionally. This lowers the barrier against retrieval and creates an environment in which those who are new to retrieval are easier to become familiar with retrieval. In the search engine, if words are enumerated dividedly space by space for saving and simplifying the inputting operation, the words are generally regarded as a retrieval expression connected using AND or OR. This is easy to become familiar even for the users who have used conventional systems.

Figure 6:
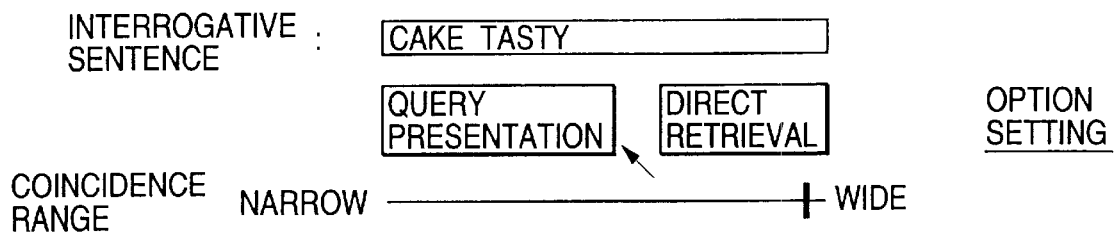
FIG. 6 is a diagram explaining the input of a primary query in the retrieval system of the present invention.

As shown in FIG. 6, a word representation "Cake Tasty" is inputted to the retrieval system from the primary query indicating unit 12 (see FIG. 5) and a "Query Presentation" button is clicked (pushed). The words "cake" "tasty" constitute a primary query as a provisional retrieval expression. It is not that the user particularly wants to obtain the representation "tasty," but wants to modify cake in some sense or another and is in a state of not hitting upon any appropriate representation. Generally, even if retrieval is made using the words "Cake AND Tasty," a vast amount of data may be outputted or a noisy result may be obtained. Thus, it is impossible to expect a very significant retrieval result. But the retrieval system of this embodiment permits the user to input using words which the user has hit upon. In the case where the user's retrieval intention is clear and a query can be described with high accuracy, an appropriate query may be inputted, followed by clicking a "Direct Retrieval" button to effect direct retrieval. In this case, the retrieving method disclosed in Japanese Published Unexamined Patent Application No. Hei 8-129554 entitled "Relational Representation Extracting System and Retrieving System" can be applied. Thus, when the direct retrieval button (see FIG. 6) is clicked, the words inputted in the item of interrogative sentence in FIG. 6 are recognized as actual retrieval words, namely, as an actual retrieval query, and not a primary query.

If the user creates the state shown in FIG. 6, that is, if the user inputs "cake" and "tasty" in the item of interrogative sentence and pushes the "Query Presentation" button without clicking the "Direct Retrieval" button, there will issue a preliminary retrieval indication for the search engine-side database unit 2 (see FIG. 5) via http. It is here assumed that a simple AND retrieval of words is once performed. Of course, a weighted OR retrieval or the like may be conducted at this stage.

With respect to the contents of URLs precollected from the Internet 7 by the collecting unit 6, it is assumed that indexes of key words and relational representations have been given beforehand to the database unit 2 through the key word/relational representation extracting unit 3. The relational representation represents a correlation of plural words, and for this extraction there may be used the same method as in the aforesaid publication Hei 8-129554. As to the extraction and retrieval of key words, it can be done using the full text retrieval technique which is well-known.

In the Internet search engine there generally are obtained a large amount of search results, but in this embodiment processing is carried out in the relation expanding/reducing unit 4 for a portion of data having been sampled.

First, sampled data are held in the sample holding unit 41 included in the relation expanding/reducing unit 4. The sampled data may be high-rank data in a certain ranking or may be randomly sampled ones. In this embodiment, 100 cases of high-rank results for the primary query inputted by the user are subjected to processing. For ranking there usually is employed such information as frequency information, say, tf*IDF, or closeness between words. In each data is contained relational representation data extracted beforehand in the key word/relational representation extracting unit 3 and held in the database. It is assumed that all the information pieces calculated in the relation expanding/reducing unit 4 are based on the sampled data in question. The use of the sampled data mainly aims at speed-up of processing for a large amount of data. Unless there is any special problem, for example, when the amount of search result is small or if a high speed is not required, there may be used all the data. Also as to the extraction of a relational representation, it may be done at the time of execution of the processing.

Next, in the relation estimating unit 42, a correlation of words in the inputted primary query, namely, a correlation of "cake" and "tasty" which have been inputted by the user is estimated. More specifically, the independent words included in the primary query and a group of independent words in relational representations included in the sample sets are compared with each other and coincident ones are enumerated and counted. In this case, the independent words in the primary query are the words "cake" (noun) and "tasty" (adjective), while the relational representations included in the sample sets, namely, representations including "cake" and "tasty" and extracted from actual data, are classified into several types.

Figure 7:
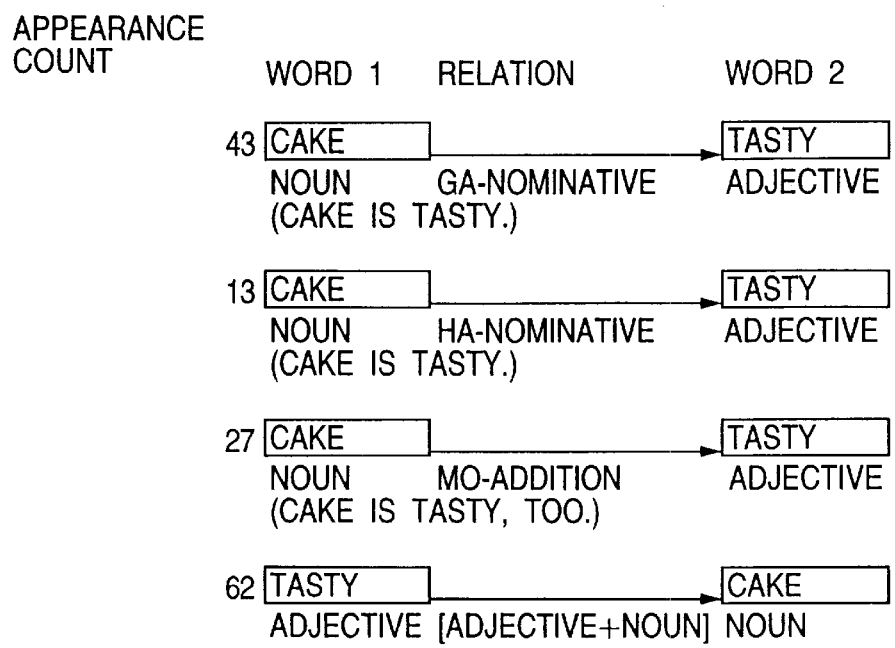
FIG. 7 is a diagram explaining extraction and estimation of relational representations in the retrieval system of the present invention.

For example, in the 100 sample sets held by the sample holding unit 41, there are obtained the following relational representations having the same independent words ("cake" "tasty" ) as shown in FIG. 7 and in the following respective numbers:

| | |
|---|---|
| "cake GA-NOMINATIVE tasty" (Cake is tasty.) | 43 |
| "cake HA-NOMINATIVE tasty" (Cake is tasty.) | 13 |
| "cake MO-ADDITION tasty" (Cake is tasty, too.) | 27 |
| "tasty [adjective + noun] cake" | 62 |

The total of the above count numbers is larger than the number of documents to be subjected to processing (100 cases in this embodiment as noted previously) because plural words are sometimes included in a single document.

For the plural relational representation groups thus extracted, a typical relational representation corresponding to the primary query inputted by the user is estimated. As a concrete method, there may be used the method disclosed in Japanese Published Unexamined Patent Application No. Hei 7-319885 entitled "Key Word Extracting Apparatus." In brief, the foregoing relations are not contradictory to one another (can be the same conceptually) and the relation of [adjective+noun] is the highest in frequency (62 cases) and low in the level of abstraction (representing well a concrete relation between concepts). For this reason, the relational representation "tasty [adjective+noun] cake" is selected as a typical relational representation which is easy to understand for man. These criteria for the selection are set in advance. For such a parameter as frequency there may be provided a suitable threshold value for the estimation of plural candidates.

In accordance with the result of the estimation made by the relation estimating unit 42 there is made expansion of relational representations in the relation expanding unit 43. The expansion is carried out taking out relational representations partially coincident with the above-estimated relational representation "tasty cake" from the sample holding unit 41 through the partial coincidence retrieving unit 44.

This example, i.e., the relational representation "tasty cake" estimated by the relation estimating unit 42, is modeled as a representation having the following three elements:

independent word group 1 (W1) relation [R]

independent word group 2 (W2)

If these elements are made corresponding to the typical relational representation estimated above, the following result is obtained:

W1: tasty

R: [adjective+noun]

W2: cake

Although in this example independent words (W) are the two of "cake" and "tasty," if the number of words inputted as a primary query by the user is large, a division is made into independent words corresponding to the number of the inputted words, which are recognized as elements.

The partial coincidence retrieval indicates taking out a relational representation coincident with only part of the three elements thus recognized, i.e., "W1," "R" and "W2." The reason why such a partial coincidence is performed is because the relational representation represents a correlation of concepts and therefore acts ANDwise and the object may be overrestricted in some particular application. However, a mere application of OR may result in a very large number of candidates, causing the processing to be delayed. To avoid this inconvenience, the matching range is widened by a partial coincidence in all the elements and thereafter the user is allowed to make a selection from candidates, thus making a relational expansion or reduction. In this way it is possible to expect maintaining an appropriate number of candidates. This is based on going through the same relation and is therefore difficult in the conventional word-level matching.

Now, relational representations coincident in two of W1 "tasty," R, and W2 "cake," are to be taken. In this case, the relational representations to be taken are those coincident in both W1 "tasty" and R or those coincident in both W2 "cake" and R because the initial retrieval was of coincidence between W1 "tasty" and W2 "cake." In this case, if the relation R is a (commutative) relation permitting a conceptual identity as mentioned in Japanese Published Unexamined Patent Application No. Hei 8-129554, it is possible to make expansion even the two are not always in the same relation. The range of expansion can be controlled by a preset information, so here the abstraction level is enhanced and expansion covers all of the relations which modify nouns as modifiers. More specifically, in addition to the above relation using adjective, there are included "adjective verb+noun" and "noun+GA-NOMINATIVE+adjective verb."

The partial coincidence retrieval can be implemented easily by using the method described in Japanese Published Unexamined Patent Application No. Hei 8-129554 and indexes established in word unit. First, as relational representations coincident in both W1 "tasty" and R, the following are obtained for example:

confectionery GA-NOMINATIVE tasty (Confectionery is tasty.)

tasty [adjective+noun] confectionery chocolate GA-NOMINATIVE tasty (Chocolate is tasty.)

In this case, in the same manner as above, the frequency of appearance is counted and thereafter typical relational representations are estimated. By this processing, such a relational representation group as shown in FIG. 8 is extracted as a result of expansion. Since the word "tasty" and the relation "modifying" are here fixed, the relations obtained are those including nouns which have a modified relation based on "tasty." In the example shown in FIG. 8, a total of ten words, including "cake," "confectionery," and "chocolate," are extracted as nouns having a modified relation based on "tasty." The ten words thus extracted are ten high-rank words from the top in a suitable ranking. This is because in this system even extraction of words of a very low frequency may result in noise and because too large a number of candidates to be subsequently presented may result in much time and labor required for the user. In this example the ranking is determined with use of frequency. As to the number of words to be extracted and how to effect the ranking, they may be selected from various modes.

Next, the same processing as above is applied to those with W2 "cake" and R being coincident with each other, whereby such a relational representation group as shown in FIG. 9 is obtained. Extracted words are "tasty," "like," "famous,". . . , which are in a modifying relation to "cake."

For enlarging the expansion range to a further extent, there also are extracted relational representations coincident in only W1 "tasty" or W2 "cake." At this time, as a matter of course, the relation which can coincide with the previously-extracted relation on "modifying" is excluded. As to the condition to what degree such a partial coincidence is to be performed, it may be established, for example, by setting such a slider as shown in FIG. 6 in the user interface and allowing the user to set the slider, or by using a suitable preset value. In the example being considered, it is assumed that a rather wide expansion is performed so that the condition is set by the slider shown in FIG. 6, and so that a partial coincidence of only one word is permitted.

In this case, since W1 "tasty" and W2 "cake" can each be connected also to a verb, they are extracted as action connecting relations, as shown in FIG. 10. In this connection, since the absolute number of relations wherein adjective modifies verb is small, the number of words to be extracted is assumed to be five head words. In this example, moreover, the scoring of Japanese native verbs and Chinese-originated verbs is changed in connection with ranking. More particularly, a score twice as large as Chinese-originated verbs (introduction, selling) is given to Japanese native verbs (eat, make). This is because in WWW documents there are included many mild representations and therefore it is intended to attach more importance to Japanese native verbs. Conversely, the score of Chinese-originated verbs may be increased, or even as to another part of speech, the extraction standard or the scoring rule may be changed suitably according to conditions. As to such verbs as "be" and "become," these are less useful as long as relation is concerned, so are excluded with use of an inhibit word dictionary. This method is generally adopted also in the conventional extraction of key words on a word base. This is also the case with such a formal noun as "thing," not limited to the verb.

Regarding W2 "cake," there can be a connection of nouns with each other, say, cheese cake. Such connections are extracted as noun connection relations, as in FIG. 11. The words extracted in the example shown in FIG. 11 include "cheese," "taste" and "shop."

The results of the relational expansion based on the above partial coincidence are gathered into query candidates in the query candidate synthesizing unit 5.

The expanded relational representations are based on their having been cataloged beforehand as indexes in the database unit, so are guaranteed to be used as they are as queries for database retrieval. That is, the absence of a gap between query representations and database-side representations is guaranteed in advance. The query candidates are synthesized so as to be suitably categorized and have priority to permit easy selection on the user side. In such a state the query candidates are presented to the user. In this example, the relations extracted previously, such as modifying, modified, and object of action, are used as categorizing standards. This is intuitive for selecting a query based on a relational representation and is considered to be one of appropriate ones.

The modifying, modified, and object of action referred to above as categorizing standards are mere examples, with no limitation made to only one. Various standards are applicable. For example, there may be adopted a method wherein categorization is conducted at plural levels using a thesaurus and on the basis of a hierarchical relation between words. In this case, if an existing thesaurus is applied to a WWW page, a satisfactory result is not obtained in many cases because it is impossible to specify an object. In this connection, for example by using the method disclosed in Japanese Patent Application No. Hei 9-333489 entitled "Thesaurus Retrieval Synthesizing System," it is possible to prepare a classification standard according to each purpose on the Internet.

There also are various methods for giving priority, which methods are also classified according to levels of partial coincidence so as to suit the user's intuition. Of course, various other standards are applicable such as a standard based on classification by frequency. Since a WWW-based search engine is assumed in the system of this embodiment is assumed, the results of such categorization and priority impartment are presented to the user through WWW page.

Figure 12:
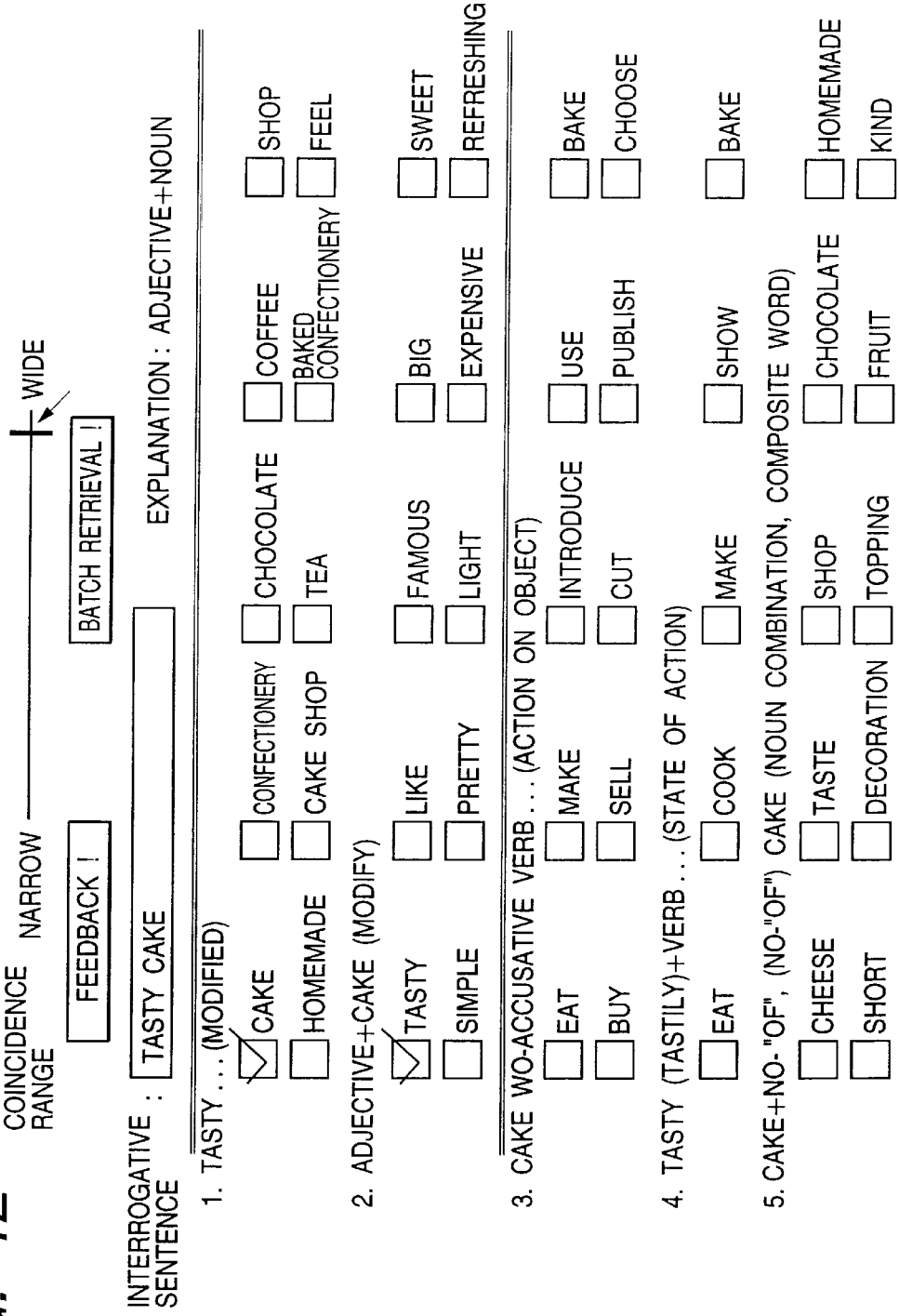
FIG. 12 is a diagram explaining a presentation example of query candidates in the retrieval system of the present invention.

In this example, the query candidates thus categorized using such standards as modifying, modified, and object of action, are presented to the user in such a form as shown in FIG. 12. The words shown in FIG. 12 are the extracted words explained previously in connection with FIGS. 8 to 11. Successively from upper to lower stages, words related to the following are enumerated together with check boxes: 1. "tasty" (modified relation) (corresponding to FIG. 8), 2. "cake" (modifying relation) (corresponding to FIG. 9), 3. "cake" (action connecting relation) (corresponding to FIG. 10), 4. "tasty (tastily)" (action connecting relation) (corresponding to FIG. 10), 5. "cake" (noun connecting relation) (corresponding to FIG. 11).

Thus, in the example shown in FIG. 12, the words as expanded results are each provided with a check box, categorized for each of relations (1.–5.), and given priority in two stages (1.–2. and 3.–5.) according to the levels of partial coincidence. By so doing it becomes possible to effect feedback matching the user's intuition and not complicated. Thus, the display on the screen fed back for the user's primary query is a simple page, but contains sufficient information for generating an actual query (actual retrieval query) in accordance with the user's instruction. The display form and the number of display words are not limited to those illustrated in FIG. 12. The display may be made in various other forms.

In the example shown in FIG. 12, as relational expressions corresponding to the primary query set previously by an arbitrary idea of the user, "cake" and "tasty" are checked for "1. tasty . . ." and "2. adjective+cake," respectively, in the respective check boxes. In this case, if a link is set for each individual word itself, not a check box, so that a general view of an actual retrieval result list, including a summary, can be taken by clicking, this will be a help to the selection.

From among the presented candidates, the user selects one meeting or close his or her retrieval intention, thereby generating an actual query, namely, an actual retrieval query which functions actually as retrieval words. In this example, the user's intention is assumed to be away from "tasty cake" and therefore "tasty" and "cake" are not selected. Of course, in the case where "tasty" and "cake" are to be selected and added to the condition established in the primary query and restriction of data is executed, the checks in their checks boxes are left selected. In a retrieval system based on Boolean expression, the user often experiences complicatedness such that when restriction of data was done to an excess using "AND," the processing returns to the initial step and another representation is selected. In contrast therewith, the primary query used in the system of this embodiment is a provisional query and therefore such widening and narrowing operations themselves are included in the retrieval sequence.

Figure 13:
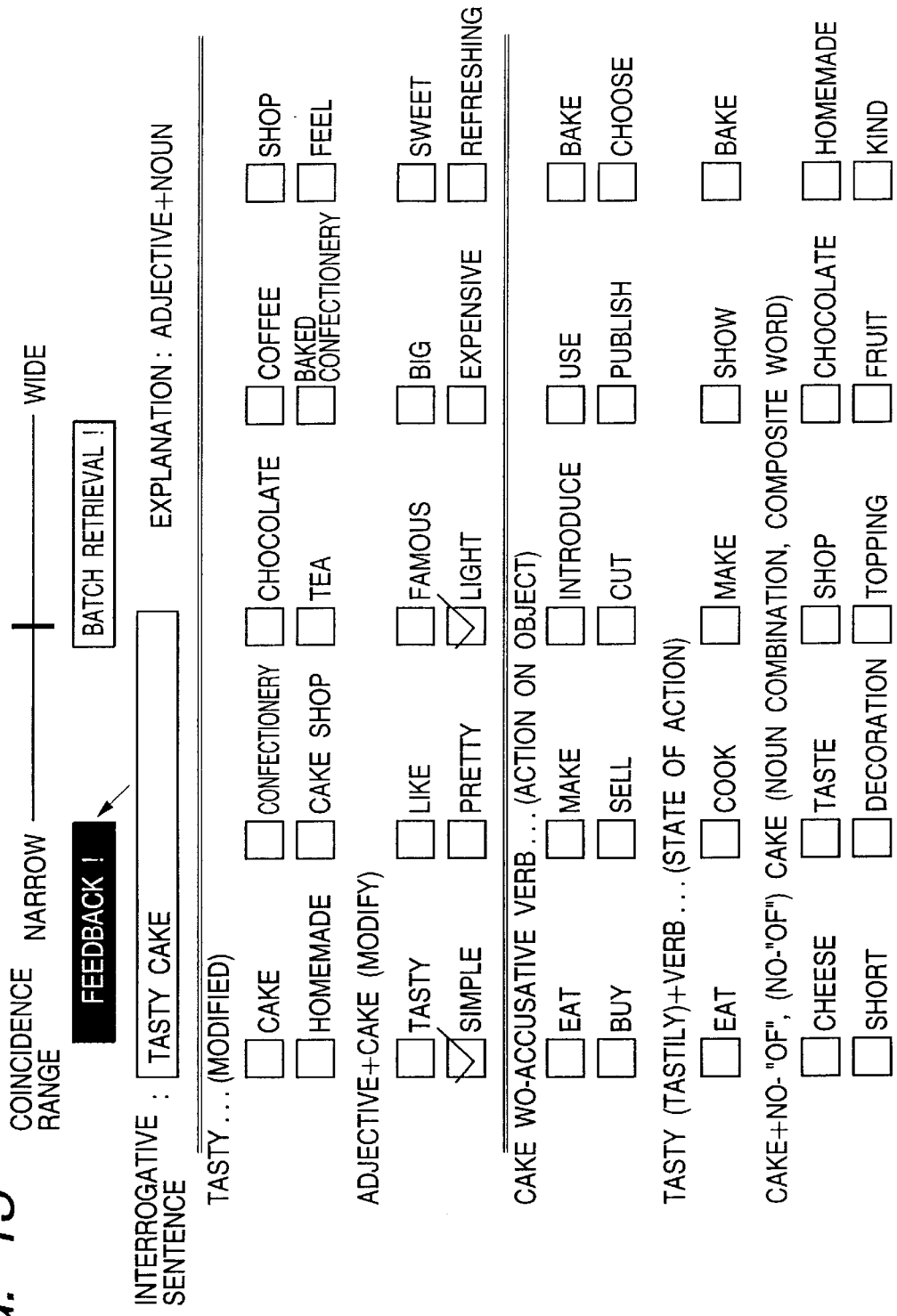
FIG. 13 is a diagram explaining the selection from query candidates and feedback in the retrieval system of the present invention.

Now, it is assumed that "simple" and "light" have been chosen (by checking the respective check boxes) in the modifying relation of "2. adjective+cake." At this time, the display of the browser is as shown in FIG. 13.

In the initial state, between items of categorized relational units such as "1. tasty," "2. adjective+cake," and "3. cake WO-ACCUSATIVE verb, the above selections act as AND conditions, while the words in the same item, that is, "simple" and "light" in item "2. adjective+cake" in this example, act as OR conditions. Since "cake" is not checked, any nouns as modified words can take coincidence. In this connection, "something" is represented by χ for the convenience of description. It follows that "simple χ" or "light [adjective+noun] χ" has been designated.

Thus, it is possible to specify whether AND/OR condition or the original query is to be retained in an intuitively natural form or not, and therefore the user is not bothered by any complicatedness in establishing a query.

Further, since the retrieval intention has now become restricted, the slider in the coincidence range is moved in a narrowing direction, as shown at the top of FIG. 13. By so doing, matching can no longer be taken for those coincident in only words, but only those including relations to at least the selected words come to be obtained as results. At this time, by pushing "Feedback!" button, relational representations are synthesized from the selected contents and are fed again to the relation expanding/reducing unit 4. Since the feedback is also performed for sample sets, it is possible to expect speed-up of the processing.

Unlike the previous case, since the relation is specified and it is not necessary to estimate the relation, the relational representations are fed directly to the relation expanding unit 43. In this case, "simple χ" and "light [adjective+noun] χ" are fed at OR condition and are expanded through the partial coincidence retrieving unit. The following are obtained as partial coincidence results:

simple taste taste GA-NOMINATIVE simple (Taste is simple.)

light [adjective+noun] sweetness pie GA-NOMINATIVE light (Pie is light.)

. . .

Figure 14:
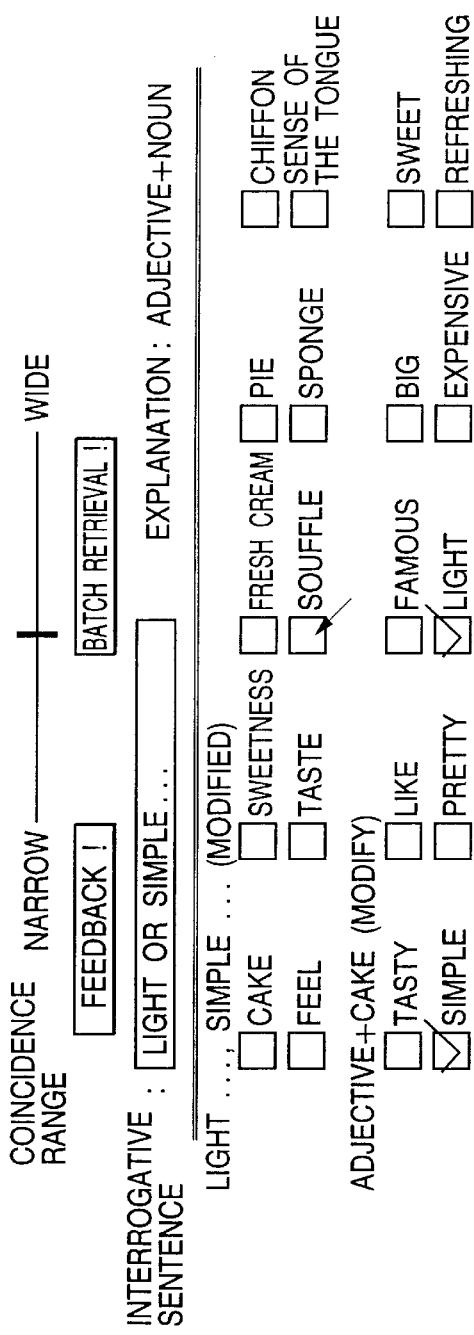
FIG. 14 is a diagram explaining the selection from query candidates and feedback in the retrieval system of the present invention.
Figure 15:
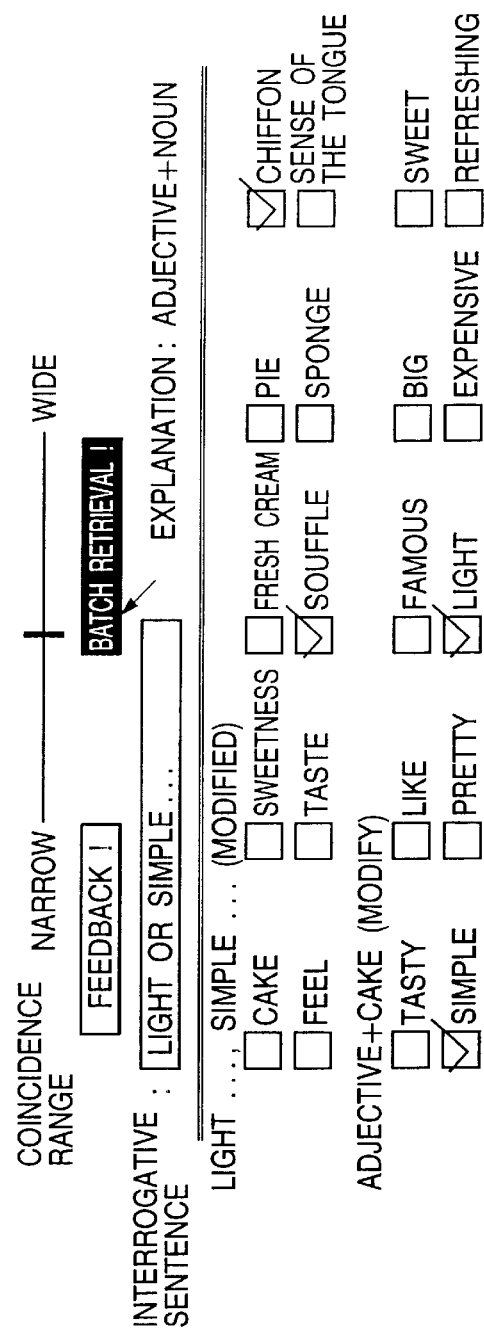
FIG. 15 is a diagram explaining the selection from query candidates and the execution of retrieval in the retrieval system of the present invention.
Figure 18:
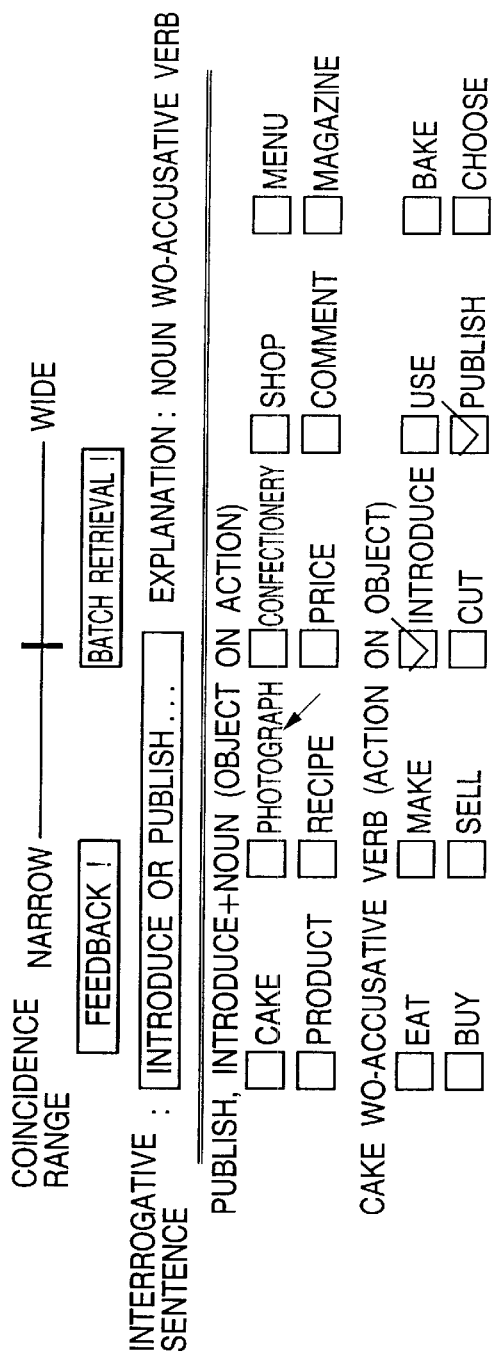
FIG. 18 is a diagram explaining the selection from query candidates and feedback in the retrieval system of the present invention.

For these results, the estimation of relation is made again in the same manner as above and the result obtained is fed back to the user, which is as shown in FIG. 14. The user again chooses words meeting his or her intention. In this case, as shown in FIG. 15, "soufflé" and "chiffon" are selected from a modified relation while allowing the original words "simple" and "light" to remain, and "Batch Retrieval" button is once clicked to carry out retrieval actually. As a result, there internally is synthesized a query of "(light OR simple) [modify] (soufflé OR chiffon)" (a query for document retrieval execution) and a retrieval indication is issued actually to the database. In the system of this embodiment, as noted previously, it is guaranteed that the result of synthesis leads to a correct query. The result obtained is shown as in FIG. 16 as is the case with the ordinary type of a retrieval engine. Although this is an example, by only a simple operation based on the selection query candidates can the user expect to obtain a result close to his or her retrieval intention from the initial retrieval result.

If the result obtained matches the retrieval intention, the retrieval itself is completed, but an example of proceeding with the retrieval is considered here. It is now assumed that in the display state shown in FIG. 12, "introduce" and "publish" shown in FIG. 17 are chosen as actions related to an object and that "Feedback!" button is pushed. As a result, various representations as objects of actions other than "cake" are presented. On seeing these representations, if the user wants to drop in at a shop introduced in a magazine or the like, the user can choose "shop" and "magazine," while if the user wants to obtain something which can serve as a reference for nice looks and how to make in the case of making at home, the user can choose "photograph" and "recipe" according to his or her intention, as shown in FIG. 19.

Figure 19:
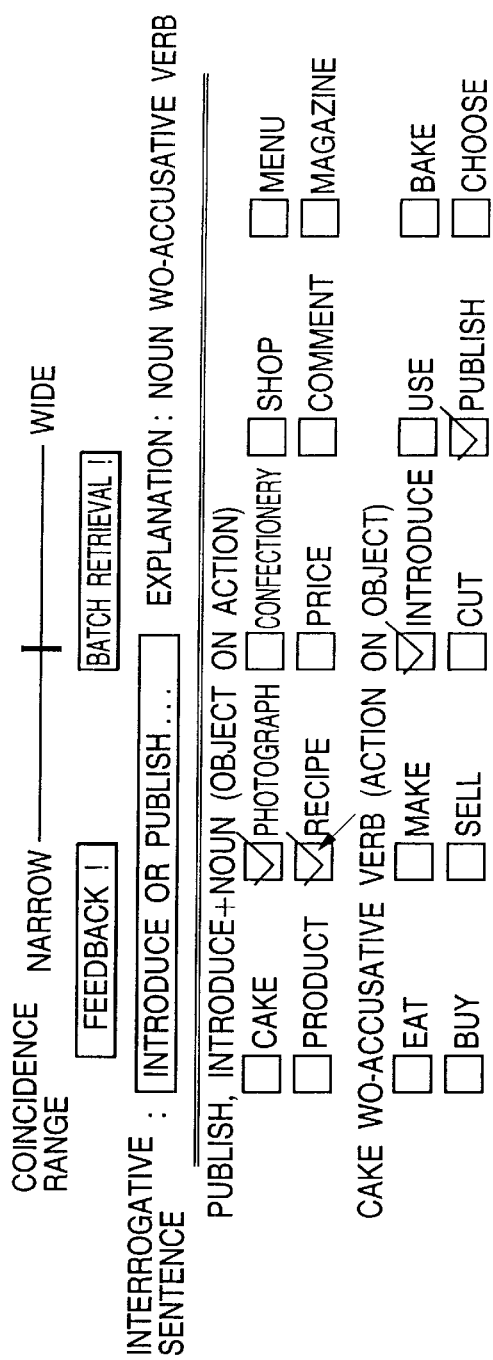
FIG. 19 is a diagram explaining the selection from query candidates and the execution of retrieval in the retrieval system of the present invention.

If a batch retrieval is executed with check marks attached to "photograph," "recipe," "introduce" and "publish" as in FIG. 19, there internally is synthesized a query of "(photograph OR recipe) [modify] (introduce OR publish)" and a retrieval indication is issued actually to the database. As mentioned above, it is guaranteed that this synthesis result becomes a correct query.

Although an example of retrieval execution with check marks removed from "cake" and "tasty" as the original primary query of the user, both check marks may be kept remained according to the user's retrieval intention. In the latter case, the words "cake" and "tasty" also function as actual retrieval words.

Thus, even the expansion of a query which heretofore has been unable to imagine until actual seeing of a retrieval result can be implemented naturally and easily by successive selections of candidates which have been synthesized on the basis of actual examples.

According to the present invention, as set forth above, it becomes possible solve the following three problems in information retrieval at a time which problems have heretofore been considered contrary to one another.

(1) Difficulty in Preparing a Query (Particularly to Beginners)

Even if the user's retrieval intention is not clear, it is possible for the user to input words which the user hits upon as a primary query suitably and successively. In addition, by performing a partial matching (partial coincidence retrieval) using relational representations estimated from sample sets, an appropriate actual retrieval query can be obtained by feedback even if the primary query inputted initially by the user somewhat deviates from the user's retrieval intention, thus permitting retrieval which suits the user's intention.

(2) Gap between Query and Index in Database

Since various relational representations extracted on the basis of each expanded and synthesized primary query are based on those cataloged beforehand as indexes in database, it is guaranteed that they are each applicable as it is as a query for actual retrieval.

(3) Difficulty of Relevance Feedback (it Is Not Certain What Influence a Change Will Exert)

The user can take a look at plural candidates of an actual retrieval query to be used in actual retrieval, as a display categorized at a predetermined standard and given priority. A simple selection of an actual retrieval query from this sight makes it possible to effect feedback.

According to the configuration of the present invention, as described above, in information retrieval which has so far been difficult to beginners, the user is merely required to input a primary query constituted by a simple enumeration of words, on the basis of an arbitrary idea of the user, and make subsequent interactive inputs, whereby a query (for actual retrieval) adapted for the database can be created without the user's extra attention. Therefore, even for a giant data group such as where information retrieval covers the Internet, the user can effect the retrieval easily at low cost without loss of time.

Further, the user can effectively experience such a sequence of clarifying the retrieval intention, so by repeating retrieval operations, the possibility can be expected that an appropriate query which includes an appropriate relational representation from the beginning may be created by a learning effect.

What is claimed is:

1. A document retrieval system for execution of document retrieval of one or more documents in an unstructured database, comprising:

a primary query designating part that designates a primary query as a provisional retrieval expression, the primary query being constituted by enumeration of arbitrary words based on an intention of a user;

a query candidate synthesizing part that, on the basis of the primary query designated by the primary query designating part, synthesizes a query candidate group based on precollected information retrieved from the unstructured database during a non-query process for querying the unstructured database; and a feedback indicating part that performs relevance feedback which presents the query candidate group synthesized by said query candidate synthesizing part to the user, and performs relevance feedback for establishing a query selected from the thus-presented query candidate group as a query for the execution of document retrieval;

a database which holds relational representation data included in the precollected information; and a relation expanding/reducing part extracting relation representation data corresponding to said primary query from the relational representation data held in said database, wherein said query candidate synthesizing part synthesizes the candidate group based on relational representation data extracted by said relation expanding/reducing part.

2. The document retrieval system according to claim 1, wherein said extracted relational representation data includes a plurality of words and also includes data showing a correlation of said plural words.

3. The document retrieval system according to claim 1, wherein said relation expanding/reducing part comprises:

a relation estimating part that estimates a correlation of the words constituting said primary query;

an expanding part that expands the constituent elements of said primary query into a relational representation on the basis of the correlation of the words estimated by said relation estimating part; and a partial coincidence retrieving part that, on the basis of the relational representation expanded by said expanding part, extracts from said database relational representation data partially coincident with the expanded relational representation.

4. The document retrieval system according to claim 3, wherein said relation expanding/reducing part further comprises a sample holding part that holds sample data obtained by sampling from said database, and the extraction of the relational representation data by said partial coincidence retrieving part is executed for the sample data held by said sample holding part.

5. The document retrieval system according to claim 3, wherein said expanding part classifies the constituent elements of the relational representation of said primary query estimated by said relation estimating part into one or more independent words (W) and relation data (R) showing a correlation of said independent words, and determines an independent word (W) for the retrieval to be executed by said partial coincidence retrieving part, or a combination of the independent word (W) with the relation data (R), and said partial coincidence retrieving part executes a partial coincidence retrieval on the basis of the independent word (W) or combination of the independent word (W) with relation data (R) determined by said expanding part.

6. The document retrieval system according to claim 3, wherein the relational representation expanded by said expanding part is a representation corresponding to relational representation data cataloged beforehand as index in said database.

7. A document retrieval method for the execution of document retrieval of one or more documents in an unstructured database, comprising:

a primary query designating step of designating a primary query as a provisional retrieval expression which is constituted by enumeration of arbitrary words based on an intention of a user;

a query candidate synthesizing step of synthesizing a query candidate group for querying the unstructured database based on information pre-retrieved from the unstructured database during a non-query process and the primary query designated in said primary query designating step;

a feedback step of presenting to the user the query candidate group synthesized in said query candidate synthesizing step and establishing a query selected from the thus-presented query candidate group as a query for the execution of document retrieval; and a relational representation data extracting step of extracting relational representation data corresponding to said primary query from relational representation data generated based on the pre-retrieved information held in a database, wherein said query candidate synthesizing step synthesizes a query candidate group based on the extracted relational representation data.

8. The document retrieval method according to claim 7, wherein said relational representation data extracting step comprises a relation estimating step of estimating a correlation of the words constituting said primary query, an expansion step of expanding constituent elements of said primary query into a relational representation on the basis of the correlation of the words estimated in said relation estimating step, and a partial coincidence retrieving step which extracts from said database relational representation data partially coincident with the relational representation expanded in said expansion step, on the basis of the expanded relational representation.

9. The document retrieval method according to claim 8, wherein the extraction of the relational representation data in said partial coincidence retrieving step is executed for sample data held by a sample holding part that holds sample data obtained by sampling from said database.

10. The document retrieval method according to claim 8, wherein said expansion step comprises a step of classifying the constituent elements of the relational representation of said primary query estimated in said relation estimating step into one or more independent words (W) and relation data (R) showing a correlation of said independent words and then determining an independent word (W) for the retrieval to be executed by said partial coincidence retrieving part, or a combination of the independent word (W) with the relation data (R), and said partial coincidence retrieving step executes a partial coincidence retrieval on the basis of the independent word (W) or combination of the independent word (W) with the relation data (R) determined in said expansion step.

11. A document retrieval system that retrieves one or more documents from an unstructured database, comprising:

a primary query designator that receives a primary query that specifies a provisional retrieval expression, the provisional retrieval expression including arbitrary words;

a query candidate synthesizer that synthesizes a candidate query based on the provisional retrieval expression and information pre-retrieved from the unstructured database during a non-query process for querying the unstructured database; and a feedback indicator that presents the candidate query with relevance information to the user prior to a query execution, and receives acceptance of the candidate query for retrieving one or more documents;

a database which holds relational representation data;

a relation expanding/reducing part extracting relation representation data corresponding to said primary query from the relational representation data held in said database, wherein said query candidate synthesizing part synthesizes the query candidate based on the relational representation data extracted by said relation expanding/reducing part.

12. A method for document retrieval from an unstructured database, comprising:

receiving a primary query that specifies a provisional retrieval expression which includes arbitrary words;

synthesizing a candidate query for querying the unstructured database based on information pre-retrieved from the unstructured database during a non-query process and the provisional retrieval expression;

presenting to a user a candidate query with relevance information prior to a query execution;

receiving an acceptance of the candidate query; and extracting relational representation data corresponding to said primary query from relational representation data generated based on the pre-retrieved information, wherein the candidate query is synthesized based on extracted relational representation data.

13. The document retrieval system according to claim 11, wherein said extracted relational representation data includes a plurality of words and also includes data showing a correlation of said plural words.

14. The document retrieval system according to claim 11, wherein said relation expanding/reducing part comprises:

a relation estimating part that estimates a correlation of the words constituting said primary query;

an expanding part that expands constituent elements of said primary query into a relational representation based on the correlation of the words estimated by said relation estimating part; and a partial coincidence retrieving part that, on the basis of the relational representation expanded by said expanding part, extracts from said database relational representation data partially coincident with the expanded relational representation.

15. The document retrieval system according to claim 14, wherein said relation expanding/reducing part further comprises a sample holding part that holds sample data obtained by sampling from said database, and the extraction of the relational representation data by said partial coincidence retrieving part is executed for the sample data held by said sample holding part.

16. The document retrieval system according to claim 14, wherein said expanding part classifies the constituent elements of the relational representation of said primary query estimated by said relation estimating part into one or more independent words (W) and relation data (R) showing a correlation of said independent words, and determines an independent word (W) for the retrieval to be executed by said partial coincidence retrieving part, or a combination of the independent word (W) with the relation data (R), and said partial coincidence retrieving part executes a partial coincidence retrieval on the basis of the independent word (W) or combination of the independent word (W) with relation data (R) determined by said expanding part.

17. The document retrieval system according to claim 14, wherein the relational representation expanded by said expanding part is a representation corresponding to relational representation data cataloged beforehand as index in said database.

18. The method for document retrieval according to claim 12, wherein said relational representation data extracting step comprises a relation estimating step of estimating a correlation of the words constituting said primary query, an expansion step of expanding the constituent elements of said primary query into a relational representation on the basis of the correlation of the words estimated in said relation estimating step, and a partial coincidence retrieving step which extracts from said database relational representation data partially coincident with the relational representation expanded in said expansion step, on the basis of the expanded relational representation.

19. The method for document retrieval according to claim 18, wherein the extraction of the relational representation data in said partial coincidence retrieving step is executed for sample data held by a sample holding part that holds sample data obtained by sampling from said database.

20. The method for document retrieval according to claim 18, wherein said expansion step comprises a step of classifying the constituent elements of the relational representation of said primary query estimated in said relation estimating step into one or more independent words (W) and relation data (R) showing a correlation of said independent words and then determining an independent word (W) for the retrieval to be executed by said partial coincidence retrieving step, or a combination of the independent word (W) with the relation data (R), and said partial coincidence retrieving step executes a partial coincidence retrieval on the basis of the independent word (W) or combination of the independent word (W) with relation data (R) determined in said expansion step.

* * * * *